(12) United States Patent
Tamaki

(10) Patent No.: US 10,553,243 B2
(45) Date of Patent: *Feb. 4, 2020

(54) SUBSTRATE FOR MAGNETIC DISK AND MAGNETIC DISK

(71) Applicant: HOYA CORPORATION, Tokyo (JP)

(72) Inventor: Masanori Tamaki, Higashimurayama (JP)

(73) Assignee: HOYA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/444,911

(22) Filed: Feb. 28, 2017

(65) Prior Publication Data

US 2017/0169847 A1 Jun. 15, 2017

Related U.S. Application Data

(63) Continuation of application No. 14/652,365, filed as application No. PCT/JP2013/085270 on Dec. 27, 2013, now Pat. No. 9,595,283.

(30) Foreign Application Priority Data

Dec. 29, 2012 (JP) ................................ 2012-289180

(51) Int. Cl.
*G11B 5/73* (2006.01)
*G11B 5/82* (2006.01)
*G11B 5/84* (2006.01)

(52) U.S. Cl.
CPC .............. *G11B 5/7315* (2013.01); *G11B 5/82* (2013.01); *G11B 5/8404* (2013.01)

(58) Field of Classification Search
None
See application file for complete search history.

(56) References Cited

U.S. PATENT DOCUMENTS 9,595,283 B2 * 3/2017 Tamaki ............... G11B 5/7315
9,595,284 B2 * 3/2017 Tamaki ............... G11B 5/7315
(Continued)

FOREIGN PATENT DOCUMENTS

CN          1385833 A    12/2002
CN        101010736 A     8/2007
(Continued)

OTHER PUBLICATIONS

International Search Report in PCT/JP2013/085270 dated Mar. 18, 2014.
(Continued)

*Primary Examiner* — Kevin M Bernatz
(74) *Attorney, Agent, or Firm* — Global IP Counselors, LLP

(57) ABSTRACT

A magnetic-disk glass substrate capable of suppressing turbulence of air flow in a vicinity of an outer circumferential side edge portion of the magnetic disk and suppressing disk flutter is provided. This magnetic-disk glass substrate includes a pair of main surfaces, a side wall surface formed on an outer circumferential side edge surface, and chamfered surfaces interposed between the side wall surface and the main surfaces, respectively. The side wall surface has a roundness of 1.5 µm or less. A difference in radius between an inscribed circle and a circumcircle of a plurality of outlines of the side wall surface at a plurality of positions that include a central position of the magnetic-disk glass substrate in a thickness direction and are different from each other in the thickness direction is 5 µm or less.

20 Claims, 7 Drawing Sheets

(56) References Cited

U.S. PATENT DOCUMENTS

| | | | |
|---|---|---|---|
| 9,595,286 B2 * | 3/2017 | Tamaki | G11B 5/7315 |
| 10,431,252 B2 * | 10/2019 | Tamaki | G11B 5/82 |
| 2002/0197437 A1 | 12/2002 | Hashimoto et al. | |
| 2003/0172677 A1 * | 9/2003 | Miyamoto | C03C 19/00 65/30.14 |
| 2006/0042317 A1 | 3/2006 | Miyamoto | |
| 2007/0009812 A1 * | 1/2007 | Ito | B82Y 10/00 430/5 |
| 2007/0269684 A1 | 11/2007 | Machida et al. | |
| 2010/0040907 A1 | 2/2010 | Takizawa et al. | |
| 2015/0371673 A1 | 12/2015 | Tamaki et al. | |
| 2016/0005431 A1 | 1/2016 | Tamaki et al. | |
| 2016/0280590 A1 | 9/2016 | Kashima et al. | |
| 2019/0221233 A1 * | 7/2019 | Takahashi | G11B 5/73 |

FOREIGN PATENT DOCUMENTS

| | | | |
|---|---|---|---|
| CN | 101258380 A | | 9/2008 |
| CN | 101611444 A | | 12/2009 |
| CN | 102501153 A | | 6/2012 |
| CN | 102708877 A | | 10/2012 |
| CN | 102820040 A | | 12/2012 |
| EP | 1992909 A1 | | 11/2008 |
| JP | 2004-079009 A | | 3/2004 |
| JP | 2004079009 A | * | 3/2004 |
| JP | 2006-099936 A | | 4/2006 |
| JP | 2008-217918 A | | 9/2008 |
| JP | 2008217918 A | * | 9/2008 |
| JP | 2008-310842 A | | 12/2008 |
| JP | 2008310842 A | * | 12/2008 |
| JP | 2011-198429 A | | 10/2011 |
| JP | 2012-113802 A | | 6/2012 |

OTHER PUBLICATIONS

Office Action translated into Japanese in the corresponding Chinese Patent Application No. 201810223151.1, dated Oct. 16, 2018.
Office Action dated Apr. 20, 2017 in the counterpart Chinese patent application.
Office Action translated into Japanese in the corresponding Chinese Patent Application No. 201711156365.3, dated Feb. 22, 2019.

* cited by examiner

ENLARGED CROSS-SECTIONAL VIEW TAKEN ALONG LINE X-X

SUBSTRATE FOR MAGNETIC DISK AND MAGNETIC DISK

CROSS-REFERENCE TO RELATED APPLICATIONS

This is a continuation of U.S. patent application Ser. No. 14/652,365, filed on Jun. 15, 2015, which is a U.S. National stage application of International Patent Application No. PCT/JP2013/085270, filed on Dec. 27, 2013, which, in turn, claims priority under 35 U.S.C. § 119(a) to Japanese Patent Application No. 2012-289180, filed in Japan on Dec. 29, 2012 the entire contents of which are hereby incorporated herein by reference.

BACKGROUND

Field of the Invention

The present invention relates to a magnetic-disk glass substrate and a magnetic disk.

Background Information

Nowadays, personal computers, digital versatile disc (DVD) recorders, and the like have a built-in hard disk drive (HDD) for data recording. In particular, a magnetic disk in which a magnetic layer is provided on a glass substrate is used in a hard disk drive that is used in a device premised on portability, such as a notebook-type personal computer, and magnetic recording information is recorded on or read from the magnetic layer with a magnetic head that flies slightly above the surface of the magnetic disk. A glass substrate is unlikely to be plastically deformed compared with a metal substrate (aluminum substrate) and the like, and thus is preferably used as the substrate of magnetic disks.

Moreover, the density of magnetic recording has been increased to meet the demand for an increase in the storage capacity of hard disk drives. For example, the magnetic recording information area has been made smaller using a perpendicular magnetic recording system that causes the direction of magnetization in the magnetic layer to be perpendicular to the surface of the substrate. This makes it possible to increase the storage capacity per disk substrate. In such a disk substrate, it is preferable that the substrate surface is made as flat as possible and the direction in which magnetic particles grow is arranged in the vertical direction such that the direction of magnetization in the magnetic layer faces in a substantially perpendicular direction relative to the substrate surface.

Also, in order to further increase the storage capacity, by using a magnetic head equipped with a dynamic flying height (DFH) mechanism to make the flying height of the magnetic head from the magnetic recording surface extremely short, the magnetic spacing between the recording and reproducing element of the magnetic head and the magnetic recording layer of the magnetic disk is reduced, thus further improving the accuracy of the recording and reproducing of information (improve the S/N ratio). Also in this case, it is required to make the surface unevenness of a magnetic-disk substrate as small as possible in order for the magnetic head to stably read/write magnetic recording information over a long period of time.

Servo information to be used to locate the magnetic head at a data track is recorded on the magnetic disk. It is conventionally known that when the roundness of an edge surface of the magnetic disk on the outer circumferential side (also referred to as "outer circumferential edge surface" hereinafter) is reduced, the magnetic head flies stably, the servo information is favorably read, and thus the magnetic head stably reads/writes information. For example, the technique described in 2008-217918A discloses a magnetic-disk glass substrate in which the roundness of the outer circumferential edge surface is 4 µm or less. With this glass substrate, the durability against load/unload (LUL) testing is improved by reducing the roundness of the outer circumferential edge surface.

SUMMARY

In recent years, HDDs using a shingle write system in which recording is performed in a manner in which the adjacent tracks partially overlap with each other are known. With the shingle write system, signal deterioration caused by recording on the adjacent track is extremely small, thus making it possible to dramatically increase the track recording density (also referred to as "TPI" hereinafter) and to achieve an extremely high track recording density of 500 kTPI (track per inch) or more, for example. Studies into the energy-assisted magnetic recording (EAMR) system using a magnetic material having a high magnetic anisotropy is also ongoing. In a magnetic disk for the EAMR system, the size of a magnetic particle itself can be reduced, thus making it possible to increase BPI (bit per inch) and TPI and to achieve a high recording density. On the other hand, due to the increase in TPI, the tracking performance of the magnetic head for servo signals is more rigorously required than before.

In a HDD having a track recording density of 500 kTPI or more using the shingle write system, for example, a phenomenon in which the servo signals was unstably read occurred at the edge portion of the magnetic disk on the outer circumferential side even when the roundness of the outer circumferential edge surface of the magnetic disk was reduced to 1.5 µm or less. In particular, it was difficult to stably read the servo signals on the outermost circumferential side of an outer circumferential side edge portion of the magnetic disk compared with a region on the inner circumferential side thereof.

It is an object of the present invention to provide a magnetic-disk glass substrate and a magnetic disk capable of suppressing servo signal reading errors at an outer circumferential side edge portion of the magnetic disk.

The inventor of the present invention first conceived to eliminate the influence exerted by the inner hole of the magnetic disk rattling in order to eliminate servo signal reading errors at the outer circumferential side edge portion of the magnetic disk. The HDD was assembled after precisely aligning the center of the magnetic disk with the center of a spindle. This eliminates the influence of the inner hole, and therefore, wobble of the outer circumferential edge surface of the magnetic disk in an in-plane direction is made smaller than the roundness of the outer circumferential edge surface. In this manner, the influence of the roundness of the edge surface of the magnetic disk on the inner circumferential side, and the influence of the concentricity of the inner circumferential edge surface and the outer circumferential edge surface were eliminated, but the servo signal reading errors were not suppressed.

When the roundness of the magnetic disk is reduced, flutter is suppressed, and therefore, it is conventionally thought that roundness and flutter are correlated. However, according to the studies conducted by the inventor of the present invention, flutter was not suppressed even when the roundness was reduced to 1.5 µm or less, and it was revealed that in a case where the roundness was extremely small, the roundness and the flutter were not correlated with each other.

It was thought that the reason for this was as follows. That is, the roundness of the outer circumferential edge portion has been conventionally measured by raising a plate-shaped probe that is longer than the thickness of a glass substrate in the vertical direction with respect to the main surface of the glass substrate and by bringing the probe into contact with the outer circumferential edge portion. In this case, the probe comes into contact therewith at a position in the thickness direction that projects toward the outermost side of the substrate. Accordingly, the shape projecting toward the outermost side of the substrate is reflected to the outline of the outer circumferential edge portion that serves as a basis of the roundness measurement, independently of the shape of the outer circumferential edge portion in the thickness direction. Therefore, with the conventional method for measuring roundness, the three-dimensional shape of the side wall surface of the outer circumferential edge portion in the thickness direction was not reflected. In the case where the outer circumferential edge portion of the magnetic disk was provided with sufficiently favorable roundness based on the conventional method for measuring the roundness, it was thought that the influences of factors other than the roundness exerted on the flutter were relatively increased, and thus that roundness and flutter were not correlated with each other.

Therefore, the inventor of the present invention focused attention on the shape of the magnetic disk in the thickness direction in addition to parameters of the magnetic disk in the in-plane direction such as roundness. First, variation in the thickness at the outer circumferential side edge portion of the magnetic disk was studied, but the variation was extremely small, and no problems could be found. As a result of intensive studies on other various shape parameters, it was first revealed that the inclination in the thickness direction and unevenness of the side wall surface (a surface extending in a direction orthogonal to the main surface) of the outer circumferential edge surface of the magnetic disk affected flutter in the outermost circumferential portion of the magnetic disk, and in turn, affected the reading of the servo signals. That is, it was first revealed that the roundness of the outer circumferential edge surface of the magnetic disk was made extremely small, and thus the shape of the outer circumferential edge surface in the thickness direction affected the flutter.

A magnetic-disk glass substrate of the present invention is a magnetic-disk glass substrate including a pair of main surfaces, a side wall surface formed at an outer circumferential side edge portion, and chamfered surfaces interposed between the side wall surface and the main surfaces, respectively, wherein the side wall surface has a roundness of 1.5 μm or less, and a difference in radius between an inscribed circle and a circumcircle of a plurality of outlines of the side wall surface at a plurality of positions that include a central position of the magnetic-disk glass substrate in a thickness direction and are different from each other in the thickness direction is 5 μm or less.

In the magnetic-disk glass substrate of the present invention, it is preferable that outlines in the circumferential direction are obtained at two positions on the side wall surface on an outer circumferential side spaced apart by 200 μm in the thickness direction, a middle point between centers of two least square circles determined from these outlines being referred to as middle point A, outlines in the circumferential direction are obtained at positions that are located at centers of the two chamfered surfaces on the outer circumferential side in the thickness direction, among centers of least square circles determined from these outlines, a center determined from one chamfered surface being referred to as center B and a center determined from the other chamfered surface being referred to as center C, and a sum of a distance between the middle point A and the center B and a distance between the middle point A and the center C is 1 μm or less.

The magnetic-disk glass substrate of the present invention is preferably used in the case where the thickness is 0.5 mm or less. A magnetic disk of the present invention is preferably used in the case where magnetic layers are formed on the main surfaces of the above-described magnetic-disk glass substrate.

DESCRIPTION OF EMBODIMENTS

Figure 1A:
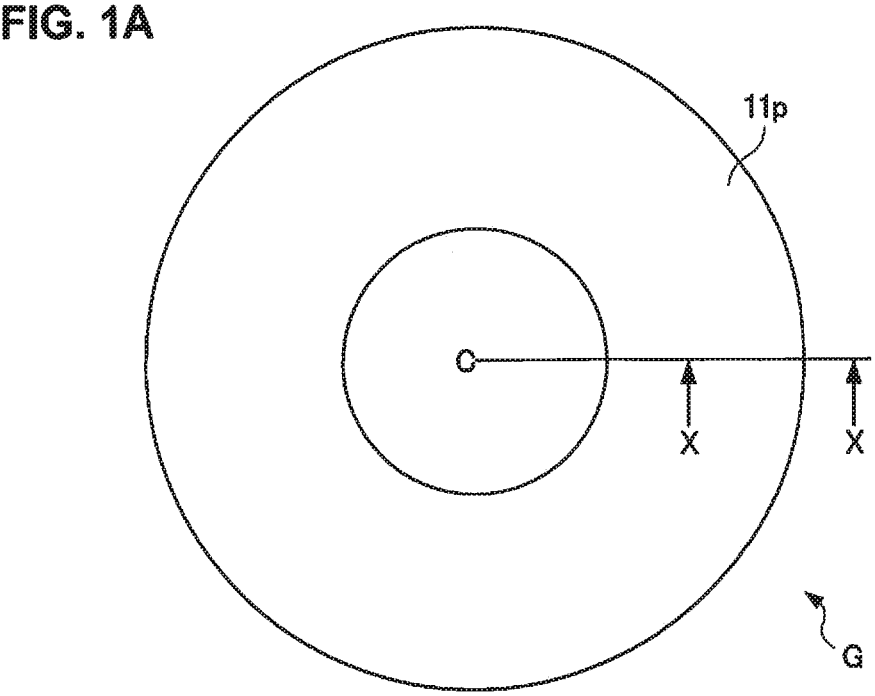
FIG. 1A is a plan view of a magnetic-disk glass substrate of the present embodiment.

Hereinafter, a magnetic-disk glass substrate of this embodiment will be described in detail.
[Magnetic-Disk Glass Substrate]

Aluminosilicate glass, soda-lime glass, borosilicate glass, or the like can be used as a material for a magnetic-disk glass substrate of this embodiment. In particular, aluminosilicate glass can be preferably used because it can be chemically strengthened and be used to produce a magnetic-disk glass substrate having excellent flatness of its main surfaces and excellent strength of the substrate. Amorphous aluminosilicate glass is more preferable.

Although there is no limitation on the composition of the magnetic-disk glass substrate of this embodiment, the glass substrate of this embodiment is preferably amorphous aluminosilicate glass having a composition including, in terms of oxide amount in mol %, $SiO_2$ in an amount of 50 to 75%, $Al_2O_3$ in an amount of 1 to 15%, at least one component selected from $Li_2O$, $Na_2O$ and $K_2O$ in a total amount of 5 to 35%, at least one component selected from MgO, CaO, SrO, BaO and ZnO in a total amount of 0 to 20%, and at least one component selected from $ZrO_2$, $TiO_2$, $La_2O_3$, $Y_2O_3$, $Ta_2O_5$, $Nb_2O_5$ and $HfO_2$ in a total amount of 0 to 10%.

The glass substrate of this embodiment may also be preferably amorphous aluminosilicate glass having a composition including, in mass %, $SiO_2$ in an amount of 57 to 75%, $Al_2O_3$ in an amount of 5 to 20% (it should be noted that the total amount of $SiO_2$ and $Al_2O_3$ is 74% or more), $ZrO_2$, $HfO_2$, $Nb_2O_5$, $Ta_2O_5$, $La_2O_3$, $Y_2O_3$ and $TiO_2$ in a total amount of more than 0% to 6% or less, $Li_2O$ in an amount of more than 1% to 9% or less, $Na_2O$ in an amount of 5 to 28% (it should be noted that a mass ratio $Li_2O/Na_2O$ is 0.5 or less), $K_2O$ in an amount of 0 to 6%, MgO in an amount of 0 to 4%, CaO in an amount of more than 0% to 5% or less (it should be noted that the total amount of MgO and CaO is 5% or less and the content of CaO is larger than that of MgO), and SrO+BaO in an amount of 0 to 3%, for example.

The glass substrate of this embodiment may also be crystallized glass containing, in terms of oxide amount in mass %, $SiO_2$ in an amount of 45.60 to 60%, $Al_2O_3$ in an amount of 7 to 20%, $B_2O_3$ in an amount of 1.00 to less than 8%, $P_2O_5$ in an amount of 0.50 to 7%, $TiO_2$ in an amount of 1 to 15%, and RO (it should be noted that R represents Zn and Mg) in a total amount of 5 to 35%, CaO in an amount of 3.00% or less, BaO in an amount of 4% or less, no PbO component, no $As_2O_3$ component, no $Sb_2O_3$ component, no $Cl^-$ component, no $NO^-$ component, no $SO_2^-$ component, no $F^-$ component, and one or more selected from $RAl_2O_4$ and $R_2TiO_4$ (it should be noted that R represents one or more selected from Zn and Mg) as a main crystal phase, in which the particle size of crystals in the main crystal phase is in a range of 0.5 nm to 20 nm, the degree of crystallization is 15% or less, and the specific gravity is 2.95 or less, for example.

The composition of the magnetic-disk glass substrate of this embodiment may include $SiO_2$, $Li_2O$ and $Na_2O$, and one or more alkaline earth metal oxides selected from the group consisting of MgO, CaO, SrO and BaO as essential components, and the molar ratio of the content of CaO to the total content of MgO, CaO, SrO and BaO (CaO/(MgO+CaO+SrO+BaO)) may be 0.20 or less, and the glass-transition temperature may be 650° C. or higher. The magnetic-disk glass substrate having such a composition is preferably for a magnetic-disk glass substrate to be used for a magnetic disk for energy-assisted magnetic recording.

An annular thin glass substrate is used as the magnetic-disk glass substrate of this embodiment. Although there is no limitation on the size of the magnetic-disk glass substrate, a magnetic-disk glass substrate having a nominal diameter of 2.5 inches is preferable for example.

Figure 1B:
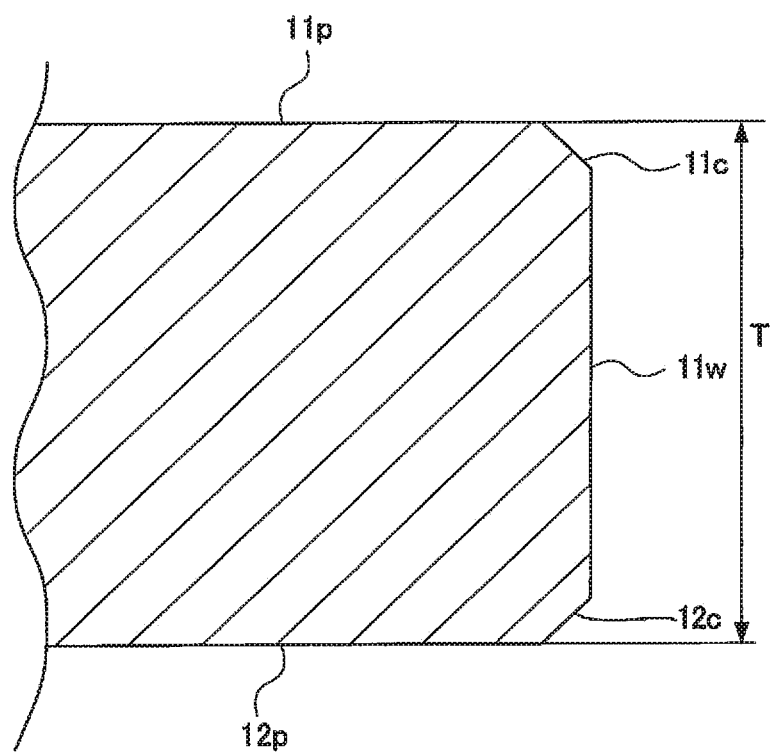
FIG. 1B is a cross-sectional view of the magnetic-disk glass substrate of the present embodiment in a thickness direction.

FIGS. 1A and 1B show a magnetic-disk glass substrate G of this embodiment. FIG. 1A is a plan view of the magnetic-disk glass substrate G, and FIG. 1B is a cross-sectional view of the magnetic-disk glass substrate G in the thickness direction. The magnetic-disk glass substrate G includes a pair of main surfaces 11p and 12p, a side wall surface 11w formed at the outer circumferential side edge portion, and chamfered surfaces 11c and 12c interposed between the side wall surface 11w and the main surfaces 11p and 12p, respectively.

Figure 2:
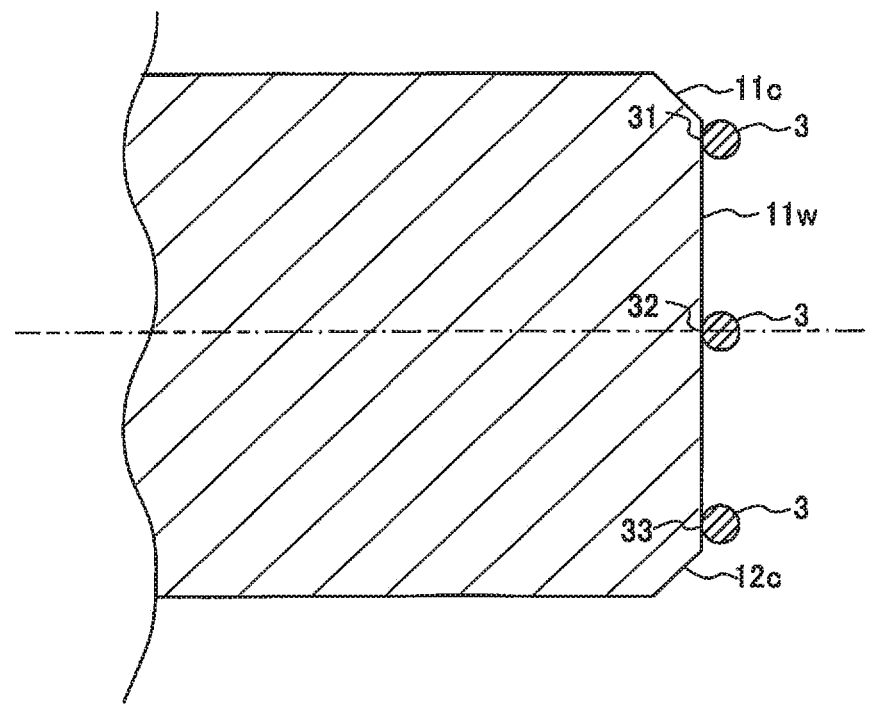
FIG. 2 is a diagram illustrating a method for measuring cylindricity of the side wall surface of the magnetic-disk glass substrate of the present embodiment.

The glass substrate G has a circular hole in the center portion. The side wall surface 11w includes a central position 32 (see FIG. 2) of the glass substrate G in the thickness direction. FIG. 2 is a diagram illustrating a method for measuring the cylindricity of the outer circumferential edge surface of the glass substrate G, and shows a cross section of the outer circumferential edge surface of the glass substrate G in the thickness direction. Inclination angles of the chamfered surfaces 11c and 12c with respect to the main surfaces 11p and 12p are not particularly limited, and are 45°, for example. In addition, the boundaries between the side wall surface 11w and the chamfered surfaces 11c and 12c are not limited to a shape having an edge as shown in the diagram, and may have a smoothly continuous curved shape.

Figure 3:
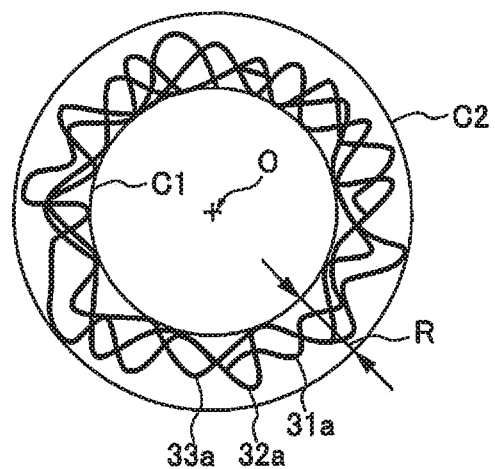
FIG. 3 is a diagram illustrating a method for measuring cylindricity of the side wall surface of the magnetic-disk glass substrate of the present embodiment.

In the magnetic-disk glass substrate G of this embodiment, the side wall surface 11w has a roundness of 1.5 μm or less at the central position 32 in the thickness direction and a cylindricity of 5 μm or less. FIG. 3 is a diagram illustrating a method for measuring the cylindricity of the outer circumferential edge surface of the glass substrate G, and shows a plurality of outlines 31a, 32a and 33a (see FIG. 3) of the side wall surface 11w at the plurality of positions 31, 32 and 33 that include the central position 32 and are different in the thickness direction. As shown in FIG. 3, the cylindricity refers to a radius difference R between an inscribed circle C1 and a circumcircle C2 of these outlines (see FIG. 3). It should be noted that it can be said that the closer to zero such an evaluation index, that is, the radius difference R, is, the closer to a geometric cylinder the shape of the outer circumferential edge surface is, and therefore, the evaluation index is referred to as "cylindricity" in this description.

(Roundness)

The roundness may be measured by a known method. For example, a plate-shaped probe that is longer than the thickness of the glass substrate is disposed in the vertical direction so as to be opposed to the outer circumferential edge surface, an outline is obtained by rotating the glass substrate in the circumferential direction, and thus a radius difference between an inscribed circle and a circumcircle of this outline can be calculated as the roundness of the glass substrate. It should be noted that a roundness/cylindrical shape measurement device can be used to measure the roundness, for example.

The roundness of the side wall surface 11w is adjusted by edge surface grinding processing, which will be described later, and edge surface polishing using a magneto rheological fluid (abbreviated to "MRF" hereinafter), which is performed as needed.

(Cylindricity)

As shown in FIG. 2, the cylindricity of the side wall surface 11w is determined by using the outlines obtained at the plurality of measurement positions 31, 32 and 33, which are different in the thickness direction, on the side wall surface 11w. The measurement position 32 is the central position of the glass substrate G in the thickness direction. The measurement positions 31 and 33 are spaced apart from the measurement position 32 by 200 μm in the thickness direction, for example. It should be noted that the number of measurement positions on the side wall surface 11w is three in this embodiment. In the case where the thickness is 0.635 mm or less or the measurement positions 31 and 33 in the above-described method for determining the measurement positions will miss the side wall surface due to the large chamfering amount or the like, the measurement positions 31 and 33 may be located at positions spaced apart from the measurement position 32 by 100 μm in the thickness direction. The number of measurement positions may be larger than three.

As a measurement device for measuring the shapes of the outer circumferential edge surface of the glass substrate G at the measurement positions 31 to 33, a device is used that can obtain outlines 31a, 32a and 33a distinctly from each other at the measurement positions 31 to 33. The above-described device for measuring roundness can be used as the measurement device. It is preferable to use a gauge head for a small hole having a relatively small diameter, with a front end having a radius of curvature of φ0.4 mm or less, for example, as a stylus. In the measurement, a stylus 3 is disposed so as to be opposed to each of the measurement positions 31 to 33 on the wall 11w to be measured of the glass substrate G, and performs the measurement on those positions in succession.

The respective outlines 31a to 33a of the measurement positions 31 to 33 are obtained by rotating the glass substrate G by one cycle in a state in which the stylus 3 is disposed so as to be opposed to the measurement positions 31 to 33. A circumcircle C2 that is in contact with the outermost side and an inscribed circle C1 that is in contact with the innermost side are determined similarly in the case of the above-described roundness, with respect to a center O that is determined by the least squares method from the outline obtained by superposing the three outlines 31a to 33a that were obtained. The radius difference R between the circumcircle C2 and the inscribed circle C1 is determined as the cylindricity of the side wall surface 11w. The cylindricity of the side wall surface 11w is adjusted by edge surface grinding processing, which will be described later, and edge surface polishing using an MRF, which is performed as needed.

(Shape Evaluation Value)

A shape evaluation value of the glass substrate G will be described with reference to FIGS. 4 and 5. The shape evaluation value is an index value for evaluating the degree of coaxiality between the side wall surface and the chamfered surfaces of the outer circumference of the glass substrate G.

Figure 4:
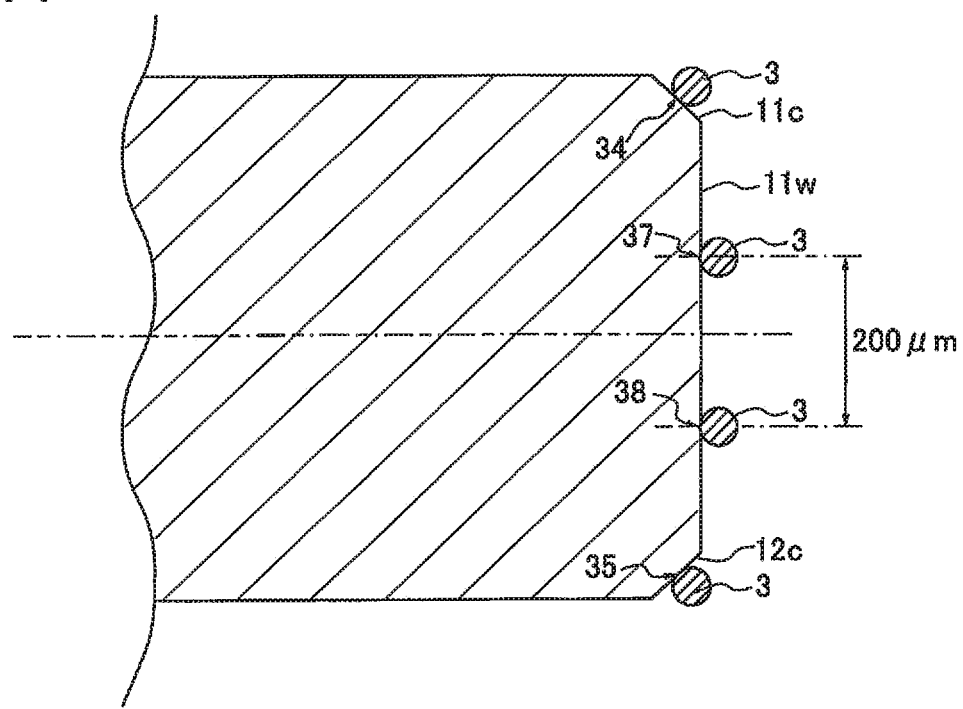
FIG. 4 is a diagram illustrating a method for measuring a shape evaluation value of the outer circumferential edge surface of the magnetic-disk glass substrate of the present embodiment.
Figure 5:
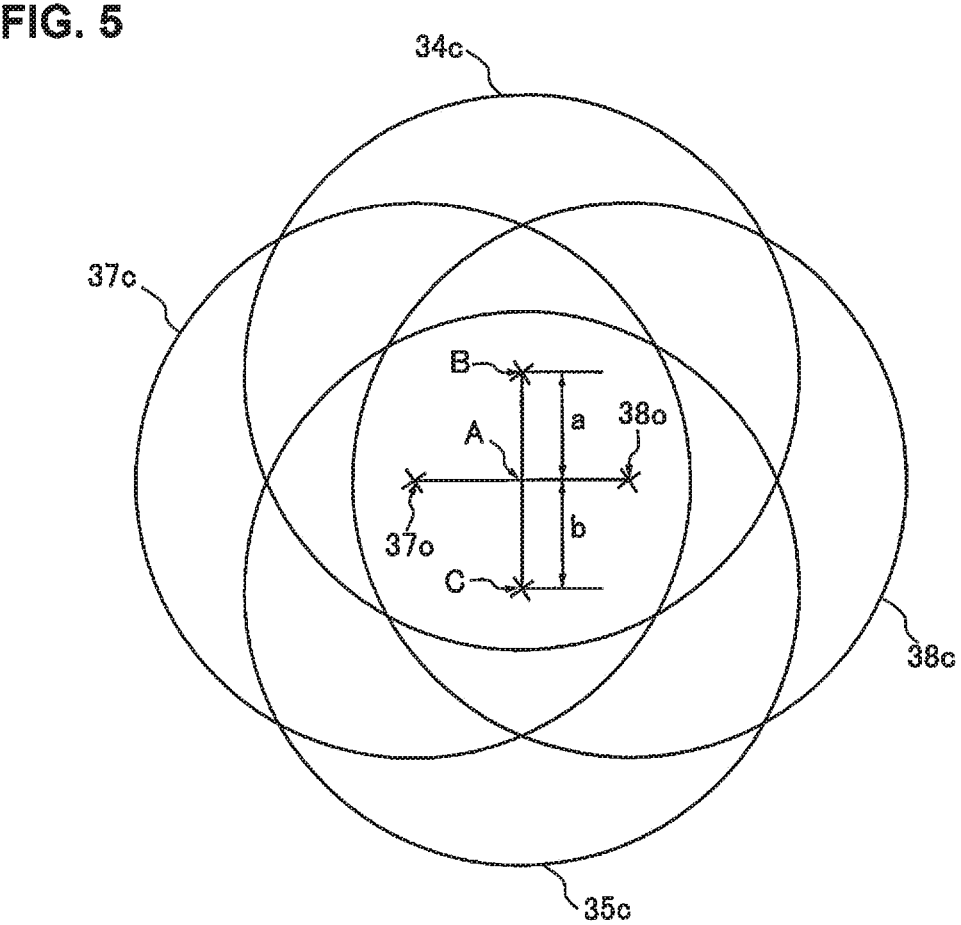
FIG. 5 is a diagram illustrating a method for measuring a shape evaluation value of the outer circumferential edge surface of the magnetic-disk glass substrate of the present embodiment.

FIGS. 4 and 5 are diagrams illustrating a method for measuring the shape evaluation value of the outer circumferential edge surface of the magnetic-disk glass substrate G of this embodiment. FIG. 4 shows a cross section of the outer circumferential edge surface of the glass substrate G in the thickness direction. An inclination angle of each of the chamfered surfaces 11c and 12c relative to the side wall surface 11w is not particularly limited, and is 40° to 70°, for example. In addition, the boundaries between the side wall surface 11w and the chamfered surfaces 11c and 12c are not limited to a shape having an edge as shown in the diagram, and may have a smoothly continuous curved shape.

Outlines in the circumferential direction are obtained at two positions 37 and 38 on the side wall surface 11w spaced apart by 200 μm in the thickness direction, and the middle point between centers 37o and 38o of two least square circles 37c and 38c determined from these outlines is referred to as "middle point A". Furthermore, outlines in the circumferential direction are obtained at positions 34 and 35 that are located at centers of the two chamfered surfaces 11c and 12c in the thickness direction, and among centers 34o and 35o of least square circles 34c and 35c determined from these outlines, one center 34o determined from the chamfered surface 11c is referred to as "center B", and the other center 35o determined from the chamfered surface 12c is referred to as "center C". In this case, the shape evaluation value is the sum of a distance a between the middle point A and the center B and a distance b between the middle point A and the center C. The shape evaluation value of the glass substrate G is preferably 1.0 μm or less, and more preferably 0.5 μm or less.

The two positions 37 and 38 on the side wall surface 11w are positions that are respectively spaced apart by 100 μm from the central position of the glass substrate G in the thickness direction toward the main surface 11p side and the main surface 12p side, for example. The measurement positions 34 and 35 for obtaining the outlines of the chamfered surfaces 11c and 12c are positions that are respectively closer to the central position side in the thickness direction by an equal distance from the main surfaces 11p and 12p, for example (positions that are respectively closer to the central position by 0.075 mm from the main surfaces 11p and 12p of the glass substrate G in a case where the chamfered surfaces of the glass substrate G have a length of 0.15 mm, for example).

As a measurement device for measuring the shapes of the outer circumferential edge surface at the measurement positions 37, 38, 34 and 35, the roundness/cylindrical shape measurement device can be used, for example. The stylus 3 of the roundness/cylindrical shape measurement device can move in micron units in the vertical direction (thickness direction).

It should be noted that the thickness of the glass substrate G is measured in advance with a micrometer prior to the measurement. Moreover, an outline shape measurement machine is used to measure the shape, the length in the thickness direction, the length in the radial direction, and the inclination angle with respect to the main surface of the chamfered surface in a cross section in the radial direction, and in addition, the length of the side wall surface in advance. The position of the boundary between the chamfered surface and the side wall surface can be determined as an intersection point of an extension line of the side wall surface and an extension line of the chamfered surface in the case where both the side wall surface and the chamfered surface have a linear outline. In the case where the chamfered surface and the side wall surface have an arc outline, each outline is approximated by a circle that best overlaps the outline, and the position of the boundary can be determined as an intersection point of the determined circles.

In the measurement, the glass substrate G is set in the roundness/cylindrical shape measurement device such that the main surface of the glass substrate G is horizontal with respect to a reference plane of the measurement device, and in addition, the center of the glass substrate G coincides with a rotation center of the measurement device. The height of a point at the front end of the stylus 3 that comes into contact with the glass substrate G in the measurement is matched with the height of the upper main surface of the glass substrate G that has been set in the measurement device. When the stylus 3 is lowered by a half distance of the thickness in the thickness direction in this state, the stylus 3 is disposed at a height of the center of the glass substrate G in the thickness direction. Then, outlines of the outer circumferential edge portion of the glass substrate G are measured at the point 37 to which the stylus 3 is raised by 100 μm from the center of the thickness and the point 38 to which the stylus 3 is lowered by 100 μm from the center of the thickness. The centers 37o and 38o of the two least square circles 37c and 38c of the side wall surface 11w are determined from these outlines, and in addition, the middle point A between the two centers 37o and 38o is determined.

In addition, the position of the stylus 3 is set to be as high as the middle position of each of the two chamfered surfaces in the thickness direction, and outlines of the outer circumferential edge portion of the glass substrate G are measured at the positions 34 and 35. The centers B and C of the least square circles 34c and 35c of the chamfered surfaces 11c and 12c are determined based on these outlines. Next, the distance a between the middle point A and the center B, and the distance b between the middle point A and the center C are summed, and thus the shape evaluation value is determined.

It should be noted that in a structure that has the above-described three cylinders having different diameters, it is conceivable that the positions 34 and 35, which are respectively as high as the middle positions of the chamfered surfaces in the thickness direction, are points that best express the degree of eccentricity of the cylinders corresponding to the chamfered surfaces. In addition, it is thought that these positions are points that most affect air flows near the chamfered surfaces. For these reasons, it is preferable to measure outlines at those positions. The shape evaluation value determined from the side wall surface 11w and the chamfered surfaces 11c and 12c is adjusted by edge surface grinding processing, which will be described later, and edge surface polishing using an MRF, which is performed as needed.

The magnetic-disk glass substrate G described above has an extremely small roundness and cylindricity. Therefore, turbulence of air flow is unlikely to occur at the outer circumferential side edge portion, thus suppressing flutter. This makes it possible to retain the tracking performance for servo information at the outer circumferential side edge portion. In particular, the tracking performance for servo information is more rigorously required in a disk having a high track recording density, such as a magnetic disk to which a shingle write system is applied, and this glass substrate G can be preferably used for the magnetic disk.

It is thought that the reason why the servo information is stably read due to the small cylindricity is as follows. If the outer circumferential edge portion of the glass substrate G has a large roundness, the amount of air pushed in the horizontal direction (surface direction) by the outer circumferential edge surface of the magnetic disk varies, causing a large turbulence of air flow. However, if the outer circumferential edge surface has an extremely small roundness, such a large turbulence of air flow is unlikely to occur. In a state in which the outer circumferential edge surface has an extremely small roundness, instead of air flow in the horizontal direction, it is important how smoothly the air flows in the thickness direction through a gap between the outer circumferential edge portion of the glass substrate G and the inner wall of the HDD so as to cross the magnetic disk.

With the studies conducted by the inventor of the present invention, it was found that in a HDD, the air steadily flows in the thickness direction through the gap between the inner wall of the HDD and the outer circumferential edge surface of the magnetic disk, and if a phenomenon that disturbs the flow and makes it irregular occurs, flutter occurs and the magnetic head flies unstably. On the contrary, if the outer circumferential edge surface of the glass substrate G has a small cylindricity, the air steadily flows smoothly in the thickness direction through the gap between the inner wall of the HDD and the outer circumferential edge surface of the magnetic disk, and thus flutter is unlikely to occur.

As described above, in a HDD having an extremely high track recording density, the turbulence of air flow in the HDD is important in improving the tracking performance of the magnetic head for servo information. Such turbulence of the air makes flutter large. There are two types of this turbulence of the air, namely turbulence that occurs periodically (steadily) and turbulence that occurs unexpectedly. Among these, the turbulence that occurs periodically can often be eliminated by changing the design of the HDD, but the turbulence that occurs unexpectedly cannot be suppressed by changing the design of the HDD, and therefore, it is required to suppress this turbulence using another means. The inventor of the present invention found that the outer circumferential edge surface of the glass substrate G caused turbulence of air flow that cannot be eliminated by changing the design of the HDD, and achieved the glass substrate G in which the outer circumferential edge surface had an extremely small cylindricity.

The glass substrate G of this embodiment has a thickness of 0.8 mm, 0.635 mm, or 0.5 mm or less, for example. In the case where the glass substrate G is used for a magnetic disk, the thinner the glass substrate G is, the more likely it is to flutter, and the more likely is the flutter to become large. However, the glass substrate G has the cylindricity of 5 μm or less as described above, and therefore, in the case where the glass substrate G is used for a magnetic disk, turbulence of air flow is suppressed at the outer circumferential side edge portion, and flutter is suppressed.

Furthermore, it is preferable that the glass substrate G of this embodiment has an extremely small shape evaluation value and the outer circumferential edge surface thereof has a shape that is unlikely to cause turbulence of air flow. If the shape evaluation value is smaller, in the case where the glass substrate G is used for a magnetic disk, flutter can be further suppressed. This makes the tracking performance of the magnetic head for servo information in the HDD more favorable.

When a magnetic disk on which a magnetic layer having a track recording density particularly of 500 kTPI (track per inch) or more is formed, such as a magnetic disk for a shingle write system or a magnetic disk for energy-assisted magnetic recording, is incorporated in the HDD, the tracking performance of the magnetic head of the HDD for servo information may be deteriorated in the case where the magnetic disk flutters, and therefore, the magnetic-disk glass substrate of this embodiment is preferable for the magnetic disk having a high recording density described above.

It is preferable that the glass substrate G of this embodiment has a dub off value, which is an evaluation index of the outer circumferential edge portion on the main surface, of 30 nm or less. In addition, it is preferable that the dub off value is greater than zero. When a profile between two points that are a point at a radius of 31.2 mm and a point at a radius of 32.2 mm is measured in a profile of the main surface of the glass substrate G in the radial direction and the two points are connected by a virtual straight line, the dub off value refers to a maximum distance from the virtual straight line to the profile of the main surface of the glass substrate G. It should be noted that when the virtual straight line is compared with the profile of the main surface and the virtual straight line is located on the center side in the thickness direction, the dub off value is positive. Conversely, when the outline of the main surface is located on the center side in the thickness direction, the dub off value is negative. The closer to zero this value is, the flatter and more favorable the shape of the main surface near the outermost circumference is, and therefore, the magnetic head flies stably. Accordingly, this in combination with an extremely small roundness and cylindricity has the effect of making the tracking performance of the magnetic head in the HDD for servo signals more favorable. The dub off value can be measured using an optical surface shape measurement device, for example. It should be noted that the dub off value in this description is obtained by measuring a region on the outer circumferential side with respect to the conventional measurement range. This makes it possible to evaluate a difference in the shape of the edge portion with higher accuracy than before.

It is preferable that in the glass substrate G of this embodiment, the main surface on the outermost circumferential side of the outer circumferential side edge portion has a nanowaviness (NW-Rq) of 0.5 (Å) or less. Here, the nanowaviness can be expressed by an RMS (Rq) value calculated as roughness in a wavelength band of 50 to 200 µm in a region of a radius of 30.5 to 31.5 mm, and can be measured using a laser type surface shape measurement device, for example.

By doing this, the magnetic head flies more stably. Accordingly, also here, this in combination with an extremely small roundness and cylindricity has the effect of making the tracking performance of the magnetic head in the HDD for servo signals more favorable.

[Method for Manufacturing Magnetic-Disk Glass Substrate]

Hereinafter, a method for manufacturing the magnetic-disk glass substrate of this embodiment will be described step-by-step. It should be noted that the order of the steps may be changed as appropriate.

(1) Glass Substrate Molding and Rough Grinding Step

After forming a sheet of plate glass by a float method, for example, a glass substrate having a predetermined shape from which a magnetic-disk glass substrate is to be made is cut out from this sheet of plate glass. A glass substrate may also be molded by pressing using an upper mold and a lower mold instead of the float method, for example. It should be noted that the method for manufacturing a glass substrate is not limited to these methods and a glass substrate can also be manufactured by a known manufacturing method such as a down draw method, a redraw method or a fusion method. It should be noted that rough grinding processing using loose abrasive particles may be performed on the two main surfaces of the glass substrate as needed.

(2) Circular Hole Forming Step

An inner hole is formed in the central portion of the glass substrate using a cylindrical drill, and thus an annular glass substrate is obtained. It should be noted that scribing using a diamond cutter or the like can also be used.

(3) Edge Surface Grinding Step

Next, the edge surfaces of the annular glass substrate are ground. The edge surfaces of the glass substrate are ground in order to form chamfered surfaces at the outer circumferential side edge portion and the inner circumferential side edge portion of the glass substrate. The grinding processing performed on the outer circumferential side edge surface of the glass substrate may be known chamfering processing with a formed grindstone using diamond abrasive particles, for example.

The outer circumferential side edge surface of the glass substrate is ground by bringing a grindstone into contact with the edge surface of the glass substrate such that a locus of the grindstone, which is in contact with the edge surface of the glass substrate, is not constant. Hereinafter, the grinding processing on the outer circumferential side edge surface of the glass substrate will be described with reference to FIGS. 6A and 6B.

Figure 6A:
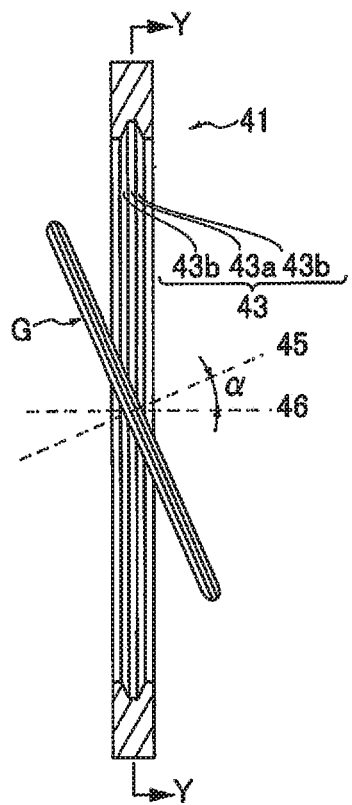
FIG. 6A is a diagram illustrating edge surface grinding processing performed on the magnetic-disk glass substrate of the present embodiment.
Figure 6B:
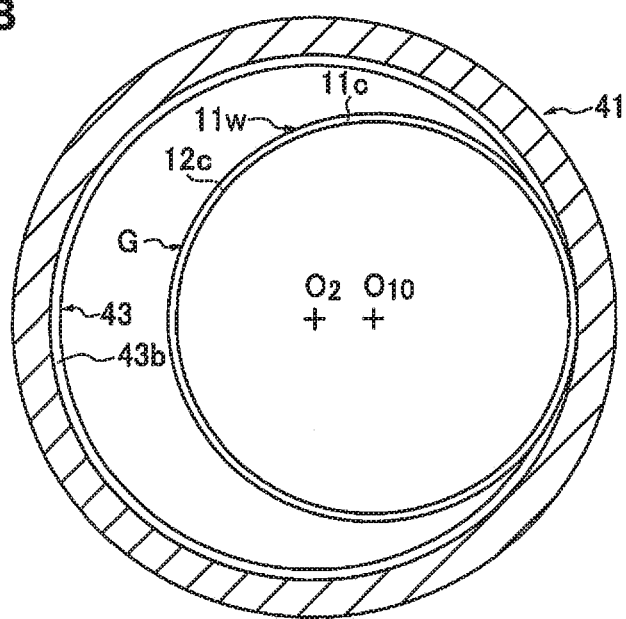
FIG. 6B is a cross-sectional view taken along line Y-Y in FIG. 6A.

FIGS. 6A and 6B are diagrams showing a method for processing the outer circumferential side edge surface of the glass substrate. FIG. 6B is a cross-sectional view taken along line Y-Y in FIG. 6A.

As shown in FIGS. 6A and 6B, a grindstone 41 used to grind the outer circumferential side edge surface of the glass substrate G is formed in an annular shape as a whole and has a groove 43. The groove 43 is formed so as to be capable of simultaneously grinding both the side wall surface 11w and the chamfered surface 11c of the glass substrate G on the outer circumferential side. Specifically, the groove 43 has a groove shape including a side wall portion 43a and chamfering portions 43b located on both sides of the side wall portion 43a. The side wall portion 43a and the chamfering portions 43b of the groove 43 described above are formed so as to have predetermined dimensions and shapes in consideration of the finishing target dimensions and shapes of the ground surfaces of the glass substrate G.

In the processing of the outer circumferential side edge surface of the glass substrate, the grinding processing is performed by rotating both the glass substrate G and the grindstone 41 while bringing the grindstone 41 into contact with the outer circumferential side edge surface 11w of the glass substrate G in a state in which the glass substrate G is inclined with respect to the groove direction of the groove 43 formed in the grindstone 41, that is, in a state in which a rotation axis 45 of the glass substrate G is inclined by an angle α with respect to a rotation axis 46 of the grindstone 41. Accordingly, the locus of the grindstone 41 that abuts against the outer circumferential side edge surface of the glass substrate G is not constant, and the abrasive particles of the grindstone 41 abut against and act on the edge surface of the substrate at random positions. Therefore, since impairment of the substrate is reduced, the surface roughness of the ground surface is reduced, and in-plane variation is reduced, it is possible to make the ground surface smoother, that is, to finish the ground surface with a quality of a level that meets the requirement for higher quality. Furthermore, the effect of improving a life of the grindstone is obtained.

Moreover, as shown in FIG. 6A, the grindstone 41 and the glass substrate G are in contact with each other in a state in which the groove 43 of the grindstone 41 and an outer diameter arc of the glass substrate G are in contact with each other in a surface contact state, thus increasing a contact area between the grindstone 41 and the glass substrate G. Therefore, a contact length (cutting blade length) of the grindstone 41 with respect to the glass substrate G is extended, thus making it possible to maintain the sharpness of the abrasive particles. Accordingly, stable grinding performance can be secured even in the case where the grinding processing is performed using a grindstone with fine abrasive particles that is advantageous in terms of the quality of the ground surface, and the favorable quality of the ground surface (mirror surface quality) can be stably obtained by grinding processing mainly using a plastic mode. In addition, the sharpness of the grindstone is maintained and the grinding performance for achieving the plastic mode is stably secured, thus making it possible to secure the favorable accuracy of dimensions and shapes obtained by chamfering processing performed on the outer circumferential side edge surface of the glass substrate.

Although the inclination angle α of the glass substrate G with respect to the above-described groove direction of the grindstone 41 can be set arbitrarily, it is preferable that the inclination angle α is in a range of two to eight degrees in order to more favorably exhibit the operations and effects described above. It is preferable that the grindstone 41 used in the grinding processing is a grindstone obtained by binding diamond abrasive particles with resin (resin bond grindstone). It is preferable to use a 2000# to 3000# diamond grindstone.

The circumferential speed of the grindstone 41 is 800 to 1000 m/minute, and the circumferential speed of the glass substrate G is about 10 m/minute, for example. In addition, it is preferable that the ratio (circumferential speed ratio) of the circumferential speed of the grindstone 41 with respect to the circumferential speed of the glass substrate G is in a range of 80 to 200.

Furthermore, it is preferable that the above-described resin bond grindstone has a grindstone elastic modulus in a range of 2000 to 3000 [N/mm]. The grindstone elastic modulus of the resin bond grindstone is an index that is correlated with a bond strength between the diamond abrasive particles and the resin.

As a result of grinding the outer circumferential side edge surface using resin bond grindstones having various characteristics and observing processed quality of the edge surface of the glass substrate, the inventor of the present invention found that the bond strength between the diamond abrasive particles and the resin in the resin bond grindstone had a large influence on the cylindricity of the side wall surface of the outer circumferential edge surface of the glass substrate subjected to the above-described grinding processing. That is, it was found that if the outer circumferential edge surface is ground using a resin bond grindstone having too high a grindstone elastic modulus, the processing rate is favorable but the surface is likely to be blemished and the cylindricity of the side wall surface is deteriorated, whereas if the outer circumferential side edge surface is ground using a resin bond grindstone having too low a grindstone elastic modulus, the cylindricity of the side wall surface is favorable but the processing rate decreases markedly. In other words, the cylindricity of the side wall surface of the glass substrate can be adjusted by changing the grindstone elastic modulus. As a result, it was found that the grindstone elastic modulus was preferably in the above-described range. By setting the grindstone elastic modulus in the above-described range, it is possible to cause the outer circumferential side edge surface subjected to the grinding processing to be a semi-mirror surface, and therefore, machining allowance can be reduced in a subsequent edge surface polishing step, thus making it possible to improve the shape accuracy of the edge portion including the cylindricity of the side wall surface while maintaining high surface quality. The grindstone elastic modulus can be calculated by measuring the displacement when an HRF indenter is pressed against the surface of the grindstone with a predetermined load (e.g., 15 kgf), using a flexural strength measurement test machine, for example.

(4) Edge Surface Polishing Step

Next, the edge surfaces of the annular glass substrate are polished. The edge surfaces of the glass substrate are polished in order to improve the properties of the outer circumferential side edge surface (side wall surface and chamfered surfaces) and the inner circumferential side edge surface of the glass substrate.

In this embodiment, edge surface polishing using an MRF is performed on the outer circumferential side edge surface of the glass substrate. In the edge surface polishing using an MRF, a mass of a magnetic slurry is formed by holding the magnetic slurry in magnetic field lines, and this mass and the outer circumferential side edge surface of the glass substrate are brought into contact and moved relative to each other, and thus the edge surface of the glass substrate on the outer circumferential side is polished. In the edge surface polishing using an MRF, the side wall surface and the chamfered surfaces can be polished simultaneously. In the edge surface polishing using an MRF, machining allowance is about 1 to 5 μm, for example.

The inner circumferential side edge surface of the glass substrate is brushed using a slurry (loose abrasive particles) containing cerium oxide abrasive particles as polishing abrasive particles. It should be noted that the edge surface polishing using an MRF, instead of brushing, may also be performed on the inner circumferential side edge surface of the glass substrate.

Hereinafter, the edge surface polishing using an MRF performed on the outer circumferential side edge surface of the glass substrate will be described in detail. FIGS. 7A to 7C and FIG. 8 are diagrams illustrating an example of a polishing method in which the edge surface polishing using an MRF is performed on the outer circumferential side edge surface of the glass substrate.

A device 20 performing edge surface polishing using an MRF polishes the edge surface of the glass substrate using a means for generating magnetism and a magnetic slurry. A magneto rheological fluid and microparticles of cerium oxide, zirconium oxide, or the like as polishing abrasive particles are used in the magnetic slurry. A fluid that contains a surfactant and non-polar oil containing magnetic microparticles constituted by Fe having a size of 0.1 to 10 μm in an amount of 3 to 5 g/cm$^3$ is used as the magneto rheological fluid, for example. The non-polar oil or polar oil has a viscosity of 1 to 20 (Pa·second) in a non-magnetization state at room temperature (20° C.).

Figure 7A:
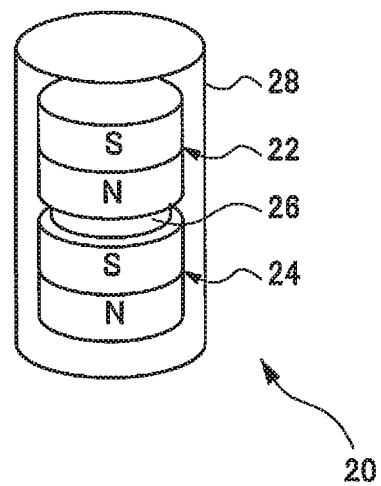
FIG. 7A is a diagram illustrating edge surface polishing using an MRF performed when manufacturing the magnetic-disk glass substrate of the present embodiment.

An outline of the device 20 performing edge surface polishing using an MRF will be described. As shown in FIG. 7A, the device 20 includes a pair of magnets 22 and 24, which are permanent magnets, a spacer 26, and a cylindrical pipe 28 made of a non-magnetic material such as stainless steel. The magnets 22 and 24 and the spacer 26 are incorporated in the pipe 28. A glass substrate that is to be subjected to the edge surface polishing using an MRF is held by a holder (not shown). The pipe 28 is disposed so as to be opposed to the outer circumferential portion of the glass substrate held by the holder, and a mass 30 of the magnetic slurry (see FIGS. 7C and 8), which will be described later, and the outer circumferential edge surface of the glass substrate are brought into contact with each other. This mass 30 formed by the magnets 22 and 24 in the pipe 28 and the outer circumferential edge surface of the glass substrate are moved relative to each other in a state in which the mass 30 and the outer circumferential edge surface are in contact with each other, and thus the outer circumferential edge surface of the glass substrate is polished. The holders (not shown) of the device 20 for holding the pipe 28 and the glass substrate are mechanically connected to a driving motor (not shown). By rotating the pipe 28 and the holders at, for example, 500 to 2000 rpm, to move the edge surface of the glass substrate and the mass 30 relative to each other, the outer circumferential edge surface of the glass substrate can be polished. It should be noted that the edge surface of the glass substrate and the mass 30 may be moved relative to each other by fixing the pipe 28 and the holders and rotating only the glass substrate.

Figure 7B:
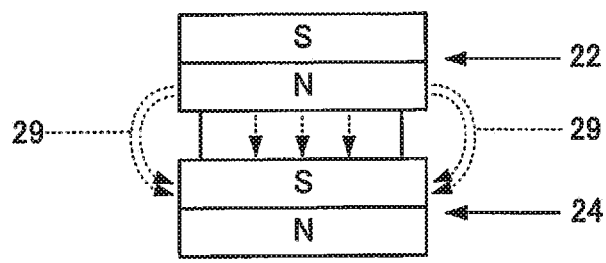
FIG. 7B is a diagram illustrating edge surface polishing using an MRF performed when manufacturing the magnetic-disk glass substrate of the present embodiment.
Figure 7C:
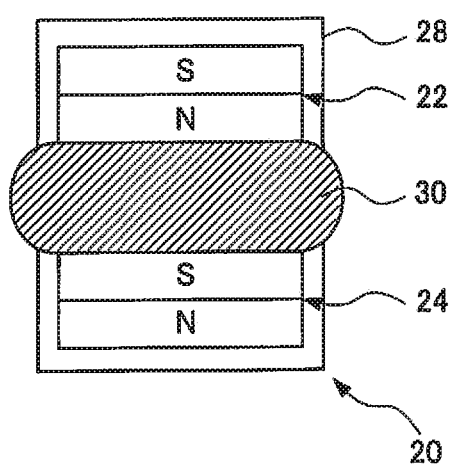
FIG. 7C is a diagram illustrating edge surface polishing using an MRF performed when manufacturing the magnetic-disk glass substrate of the present embodiment.
Figure 8:
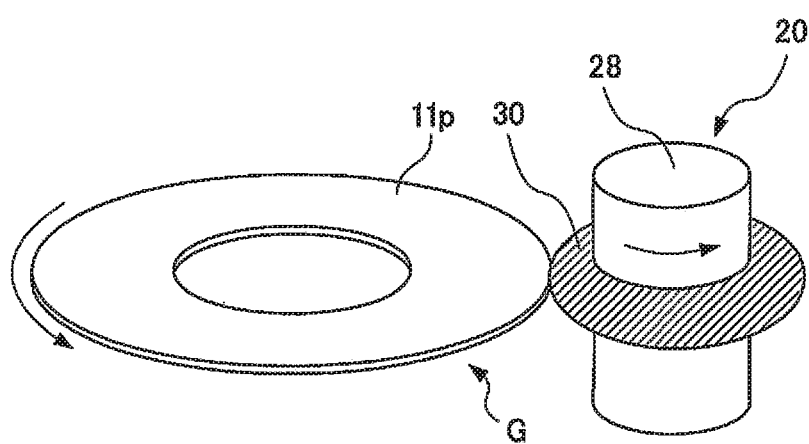
FIG. 8 is a diagram illustrating edge surface polishing using an MRF performed when manufacturing the magnetic-disk glass substrate of the present embodiment.

The edge surface polishing using an MRF will be described more specifically. The magnet 22 and the magnet 24 are close to each other, serve as a magnetism generating means, and thus form magnetic field lines 29 as shown in FIG. 7B. The magnetic field lines 29 extend so as to project outward from the center between the magnets 22 and 24 and also extend in the thickness direction of the glass substrate. The spacer 26 made of a non-magnetic substance is provided between the magnets 22 and 24 in order to form the mass 30 of the magnetic slurry as shown in FIG. 7C around the outer circumference of the pipe 28, for example. Although it is sufficient that a magnetic flux density of the magnetism generating means is set so that the mass 30 of the magnetic slurry is formed, the magnetic flux density is preferably 0.3 to 5 tesla for the purpose of performing the edge surface polishing efficiently.

It should be noted that in the example shown in FIGS. 7A to 7C and FIG. 8, permanent magnets are used as the magnetism generating means, but electromagnets can also be used. Also, the magnets 22 and 24 can be fixed to the pipe 28 to ensure a constant distance between the edge surface of the magnet 22 on the N-pole side and the edge surface of the magnet 24 on the S-pole side without the spacer 26.

Known glass substrate polishing abrasive particles such as cerium oxide, colloidal silica, zirconia oxide, alumina abrasive particles, or diamond abrasive particles can be used as the polishing abrasive particles contained in the magnetic slurry. The polishing abrasive particles have a diameter of 0.5 to 3 μm, for example. Using the polishing abrasive particles having a diameter in this range makes it possible to favorably polish the outer edge surface of the glass substrate. The polishing abrasive particles are contained in the magnetic slurry in an amount of 1 to 20 vol %, for example.

By the edge surface polishing using an MRF, contamination by attached waste and the like, and impairment such as scratches on the edge surface of the glass substrate can be eliminated. Therefore, it is possible to prevent thermal asperity and the deposition of ions such as sodium and potassium that causes corrosion. Furthermore, surface roughness and waviness can also be significantly reduced, thus making it possible to improve the shape accuracy of the edge portion including the cylindricity of the side wall surface of the glass substrate.

(5) Precision Grinding Step

In a precision grinding step, the main surfaces of the glass substrate are ground using a double-side grinding device. The double-side grinding device has a pair of upper and lower surface plates (upper surface plate and lower surface plate) and the glass substrate is held between the upper surface plate and the lower surface plate. The glass substrate and the surface plates are moved relative to each other by moving one or both of the upper surface plate and the lower surface plate, so that the two main surfaces of the glass substrate can be ground. In the precision grinding step, loose abrasive particles as well as fixed abrasive particles made of diamond can be used.

(6) First Polishing (Main Surface Polishing) Step

Next, first polishing is performed on the ground main surfaces of the glass substrate. The first polishing is performed in order to eliminate scratches and distortions that remain on the main surfaces due to the precision grinding and to adjust surface unevenness (microwaviness, roughness).

In the first polishing step, the main surfaces of the glass substrate are polished using a double-side polishing device provided with a planetary gear mechanism. The double-side polishing device has an upper surface plate and a lower surface plate. Planar polishing pads (resin polishers) are attached to the upper surface of the lower surface plate and the bottom surface of the upper surface plate. One or more glass substrates accommodated in a carrier are held between the upper surface plate and the lower surface plate, and the glass substrate and the surface plates are moved relative to each other by the planetary gear mechanism moving one or both of the upper surface plate and the lower surface plate, so that the two main surfaces of the glass substrate can be polished. It is preferable that the resin polishers are made of polyurethane. In addition, it is preferable that the hardness of the resin polishers is set to have an Asker C hardness in a range of 70 to 100.

During the relative motion described above, the upper surface plate is pressed against the glass substrate (that is, in a vertical direction) with a predetermined load, the polishing pads are pressed against the glass substrate, and a polishing liquid is supplied between the glass substrate and the polishing pads. The main surfaces of the glass substrate are polished by an abrasive contained in this polishing liquid. The abrasive is made of cerium oxide or zirconium oxide, for example. It is preferable to set the average particle diameter of the abrasive to 0.3 to 3 μm.

(7) Chemical Strengthening Step

Next, the glass substrate on which the first polishing step has been performed is chemically strengthened. Chemical strengthening step can be performed by using a mixed liquid of potassium nitrate and sodium sulfate, for example, as a chemical strengthening liquid and immersing the glass substrate in the chemical strengthening liquid.

In this manner, by immersing the glass substrate in the chemical strengthening liquid, lithium ions and sodium ions in the surface layer of the glass substrate are respectively substituted with sodium ions and potassium ions with a relatively large ion radius in the chemical strengthening liquid, and the glass substrate is strengthened.

(8) Second Polishing (Final Polishing) Step

Next, second polishing is performed. The second polishing is performed in order to mirror polish the main surfaces. In the second polishing, a polishing device similar to the polishing device used in the first polishing is used, for example. In this case, the second polishing differs from the first polishing in the type and size of loose abrasive particles and the hardness of the resin polishers. It is preferable that the hardness of the resin polishers is set to have an Asker C hardness in a range of 60 to 90. In addition, it is preferable that the resin polishers are made of polyurethane foam and are suede-type polishers.

Microparticles (particle size: diameter of about 10 to 100 nm) of colloidal silica or the like suspended in a slurry, for example, are used as the loose abrasive particles to be used in the second polishing. This makes it possible to further reduce the surface roughness of the main surfaces of the glass substrate and to adjust the shape of the edge portion in a preferable range. The polished glass substrate is cleaned to provide a magnetic-disk glass substrate.

[Magnetic Disk]

A magnetic disk can be obtained as follows using the magnetic-disk glass substrate. A magnetic disk has a configuration in which at least an adherent layer, a base layer, a magnetic layer (magnetic recording layer), a protecting layer and a lubricant layer are laminated on the main surface of the magnetic-disk glass substrate (referred to as merely "substrate" hereinafter) in this order from the side of the main surface, for example.

For example, the substrate is introduced into a film deposition device that has been evacuated and the layers from the adherent layer to the magnetic layer are sequentially formed on the main surface of the substrate in an Ar atmosphere by a DC magnetron sputtering method. CrTi can be used in the adherent layer and CrRu can be used in the base layer, for example. A CoPt based alloy can be used in the magnetic layer, for example. Also, a CoPt-based alloy or a FePt-based alloy having an $L_{10}$ ordered structure is formed to be the magnetic layer for thermally assisted magnetic recording. After the film deposition as described above, by forming the protecting layer using $C_2H_4$ by a CVD method, for example, and subsequently performing nitriding processing that introduces nitrogen to the surface, a magnetic recording medium can be formed. Thereafter, by coating the protecting layer with perfluoropolyether (PFPE) by a dip coat method, the lubricant layer can be formed. The produced magnetic disk is preferably incorporated in a magnetic-disk drive device (hard disk drive (HDD)) serving as a magnetic recording and reproduction device provided with a magnetic head equipped with a dynamic flying height (DFH) control mechanism and a spindle for fixing the magnetic disk.

WORKING EXAMPLES AND COMPARATIVE EXAMPLES

In order to confirm the effect of the magnetic-disk glass substrate of this embodiment, 2.5-inch magnetic disks (having an outer diameter of 65 mm, an inner diameter of 20 mm, and a thickness of 0.635 mm) were produced using manufactured magnetic-disk glass substrates. The glass composition of the produced magnetic-disk glass substrate is as follows.

(Glass Composition)

Amorphous aluminosilicate glass was used that contained $SiO_2$ in an amount of 65 mol %, $Al_2O_3$ in an amount of 6 mol %, $Li_2O$ in an amount of 1 mol %, $Na_2O$ in an amount of 9 mol %, MgO in an amount of 17 mol %, CaO in an amount of 0 mol %, SrO in an amount of 0 mol %, BaO in an amount of 0 mol %, and $ZrO_2$ in an amount of 2 mol %. It should be noted that the molar ratio of the content of CaO to the total content of MgO, CaO, SrO and BaO (CaO/(MgO+CaO+SrO+BaO)) was zero, and the glass-transition temperature was 671° C.

[Production of Magnetic-Disk Glass Substrates of Working Examples and Comparative Examples]

The magnetic-disk glass substrates of working examples were produced by performing the steps of the method for manufacturing a magnetic-disk glass substrate according to this embodiment in the given order.

Here, the press molding method was used in molding of the glass substrate in step (1). In the rough grinding, loose abrasive particles were used.

In the edge surface grinding step in step (3), first, the outer circumferential side edge surface of the glass substrate was chamfered with a formed grindstone using diamond abrasive particles. Then, grinding processing for finishing the surface of the edge portion into a semi-mirror surface was further performed using another formed grindstone while bringing the edge surface of the glass substrate into contact with the grindstone such that the locus of the grindstone abutting against the edge surface of the glass substrate was not constant.

In the second grinding processing performed on the outer circumferential side edge surface of the glass substrate, a resin bond grindstone with 2500# diamond abrasive particles was used, and the inclination angle ($\alpha$ in FIG. 6A) of the glass substrate with respect to the groove direction of the grindstone was set to 5 degrees. Other conditions were adjusted as appropriate.

In the edge surface polishing step in step (4), the edge surface polishing using an MRF was performed on the outer circumferential side edge surface of the glass substrate, and the inner circumferential side edge surface of the glass substrate was brushed using a slurry containing cerium oxide abrasive particles as polishing abrasive particles. In the edge surface polishing using an MRF, a slurry obtained by further dispersing cerium oxide abrasive particles in a magnetic fluid obtained by dispersing Fe microparticles in non-magnetic oil was used as the polishing slurry. Permanent magnets that each have a magnetic flux density of 3 tesla were used in the working examples.

In the precision grinding in step (5), grinding was performed using a grinding device in which grinding pads obtained by fixing diamond abrasive particles with a resin were attached to the surface plates.

In the first polishing in step (6), polishing is performed using a double-side polishing device provided with a planetary gear. A slurry containing cerium oxide abrasive particles having an average diameter of 1.5 μm was used, and a hard urethane pad (Asker C hardness: 85) was used as the polishing pad.

In the chemical strengthening in step (7), a mixed liquid of melts of potassium nitrate and sodium nitrate was used as a chemical strengthening liquid.

In the second polishing in step (8), polishing was performed with a slurry in which microparticles of colloidal silica having an average diameter of 50 nm were suspended and a suede-type polishing pad (Asker C hardness: 65) made of polyurethane foam, using a polishing device similar to the polishing device used in the first polishing. The raw glass plate on which the second polishing had been performed was cleaned, and a magnetic-disk glass substrate was obtained.

Through the above steps, the magnetic-disk glass substrates of the working examples and comparative examples were produced as shown in Table 1. As shown in Table 1, the magnetic-disk glass substrates of the working examples and comparative examples were different from each other in the roundness and cylindricity of the side wall surface of the outer circumferential edge surface. Glass substrates that were different in the roundness and cylindricity of the side wall surface were produced mainly by changing the grindstone elastic modulus of the resin bond grindstone used in the grinding processing performed on the outer circumferential side edge surface as appropriate.

The roundness of the side wall surface of the magnetic-disk glass substrate was measured by disposing a plate-shaped probe that was longer than the thickness of the glass substrate in the vertical direction with respect to the main surface of the glass substrate and obtaining an outline. The cylindricity of the side wall surface was calculated as shown in FIG. 2. That is, outlines were obtained at the central position of the side wall surface in the thickness direction and the positions spaced apart upward and downward by 200 μm from the central position, the radiuses of the inscribed circles of the three outlines were determined, the difference between the maximum value and the minimum value of the radiuses of the inscribed circles of the three outlines was determined, and the radius difference was used as the cylindricity of the side wall surface. All measurements were performed using a roundness/cylindrical shape measurement machine.

[Evaluation Method]

The magnetic-disk glass substrates of the comparative examples and working examples were prepared, and the magnetic disks were produced by forming a magnetic layer and the like. Each of the magnetic disks was incorporated in a 2.5-inch type HDD having a disk rotation rate of 7200 rpm together with a DFH head. After magnetic signals were recorded at a track density of 500 kTPI, servo signal reading testing was performed in a region of a radius position of 30.4 mm to a radius position 31.4 mm.

[Evaluation Criterion]

The number of servo signal reading errors in the HDD was evaluated. Table 1 shows the results. The magnetic disks in which the error count is 30 or less are acceptable for practical purposes.

TABLE 1

|  | Roundness (μm) | Cylindricity (μm) | Error number |
|---|---|---|---|
| Comp. Ex. 1 | 5.6 | 8 | 97 |
| Comp. Ex. 2 | 1.5 | 8 | 52 |
| Comp. Ex. 3 | 1.1 | 8 | 51 |
| Comp. Ex. 4 | 1.5 | 6 | 38 |
| Work. Ex. 1 | 1.5 | 5 | 22 |
| Work. Ex. 2 | 1.5 | 3 | 13 |
| Work. Ex. 3 | 1.1 | 3 | 13 |
| Work. Ex. 4 | 1.4 | 4 | 17 |
| Work. Ex. 5 | 0.9 | 2 | 10 |

Moreover, samples that were different in the thickness as shown in Table 2 were prepared, and were evaluated in the same manner as described above. Table 2 shows the results. It should be noted that all the samples had a roundness of 1.5 μm or less.

TABLE 2

|  | Cylindricity (μm) | Thickness (mm) | Error number |
|---|---|---|---|
| Work. Ex. 1 | 5 | 0.635 | 22 |
| Work. Ex. 6 | 5 | 0.5 | 24 |
| Comp. Ex. 2 | 8 | 0.635 | 52 |
| Comp. Ex. 5 | 8 | 0.5 | 110 |

It was confirmed from the evaluation results in Table 1 that there were a large number of servo signal reading errors in the case where the roundness greatly exceeded 1.5 μm (comparative example 1). In addition, it was confirmed that the number of errors was not sufficiently reduced in the case where the cylindricity exceeded 5 μm even when the roundness was 1.5 μm or less (comparative examples 2 to 4). On the other hand, in the case where the cylindricity was 5 μm or less (working examples 1 to 5), the number of errors was reduced to an acceptable level. In particular, in the case where the cylindricity was 3 μm or less (working examples 2, 3 and 5), favorable results were obtained.

Moreover, it was found from the evaluation results in Table 2 that in the case where the cylindricity was 5 μm or less, the servo signal reading was maintained at the acceptable level even if the thickness was 0.5 mm (working example 6), and the tracking performance of the magnetic head for servo signals was hardly deteriorated even when the thickness was small. On the other hand, it was found that in the case where the cylindricity exceeded 5 μm, the servo signal reading was markedly disturbed when the thickness was 0.5 mm (comparative example 5), and the tracking performance of the magnetic head for servo signals was extremely deteriorated.

Next, the magnetic-disk glass substrates of working examples 7 to 12 were produced. The working examples 7 to 9 were produced under the conditions for manufacturing the working example 1, and the working examples 10 to 12 were produced under the conditions for manufacturing the working example 3. In this case, glass substrates that were different in the shape evaluation value of the outer circumferential edge surface were produced by adjusting the inclination angle (α in FIG. 6A) of the glass substrate with respect to the groove direction of the grindstone, and other factors (e.g., grit of the grindstone, and circumferential speed of the grindstone or the glass substrate) in the above-described range as appropriate. As the inclination angle is increased, the surface quality after the grinding is improved, and thus the machining allowance can be reduced in the subsequent polishing. Therefore, the shape evaluation value can be improved.

Magnetic disks were produced by forming a magnetic layer on the obtained magnetic-disk glass substrates. Thereafter, fluttering was evaluated for each magnetic disk using a laser Doppler vibrometer. To evaluate fluttering, first, the magnetic disk was attached to the spindle of a hard disk drive (HDD) having a rotation rate of 7200 rpm, and the main surface of the rotating magnetic disk was irradiated with a laser beam from a laser Doppler vibrometer. Next, the laser Doppler vibrometer received the laser beam reflected by the magnetic disk, and thus the vibration value in the thickness direction of the magnetic disk was obtained. This vibration value refers to as "fluttering characteristic value".

The following is more specific description.

In the measurement of the fluttering characteristic value, a magnetic disk was attached to the spindle of a 2.5-inch type HDD and was rotated, and the main surface of the rotating magnetic disk was irradiated with a laser beam from a laser Doppler vibrometer. It should be noted that the HDD was properly equipped with a cover so as not to be affected by outside air, and the cover of the HDD was provided with a hole for laser beam irradiation. Next, the laser Doppler vibrometer received the laser beam reflected by the magnetic disk, and thus the amount of vibration in the thickness direction of the magnetic disk was measured as a fluttering characteristic value. In this case, the fluttering characteristic values were measured under the following conditions.

Environment for HDD and measurement system: The temperature was kept at 25° C. in a constant temperature and humidity chamber.

Rotation rate of magnetic disk: 7200 rpm

Laser beam irradiation position: Position 31 mm apart from the center (1.5 mm apart from the outer circumferential end) of a magnetic disk in the radial direction Minimum value of diameter of inner wall of disk-attaching portion in HDD housing: 65.880 mm

[Evaluation Criterion]

The results of evaluation of the measured fluttering characteristic values were divided to four levels, Levels 1 to 4, in descending order of favorability (that is, in increasing order of the fluttering characteristic value). Levels 1 and 2 are acceptable for practical purposes. Table 3 shows the results.

Level 1: 20 nm or less
Level 2: more than 20 nm to 30 nm or less
Level 3: more than 30 nm to 40 nm or less
Level 4: more than 40 nm

TABLE 3

|  | Shape evaluation value (μm) | Fluttering characteristic value |
|---|---|---|
| Work. Ex. 7 | 1.5 | Level 2 |
| Work. Ex. 8 | 1.0 | Level 1 |
| Work. Ex. 9 | 0.6 | Level 1 |
| Work. Ex. 10 | 1.7 | Level 2 |
| Work. Ex. 11 | 0.9 | Level 1 |
| Work. Ex. 12 | 0.5 | Level 1 |

It was found from Table 3 that in the case where the shape evaluation value is 1.0 μm or less, the fluttering characteristic values of Level 1 were obtained, and fluttering characteristics were particularly favorable. It is thought that this was because the air steadily flowed smoothly in the thickness direction through the gap between the inner wall of the HDD and the outer circumferential edge surface of the magnetic disk due to the small shape evaluation value, and thus flutter was unlikely to occur.

While the magnetic-disk glass substrate according to the present invention has been described in detail, the present invention is not limited to the above-described embodiment, and it will be appreciated that various improvements and modifications can be made without departing from the gist of the present invention.

What is claimed is:

1. An annular substrate used as an original for a magnetic-disk substrate comprising:
    a pair of main surfaces;
    a side wall surface formed at an outer circumferential side edge portion; and
    chamfered surfaces interposed between the side wall surface and the main surfaces, respectively,
    a thickness of the annular substrate being 0.635 mm or less,
    the side wall surface having a roundness of 1.5 µm or less,
    when, in the side wall surface, three outlines in a circumferential direction of the side wall surface, which include an outline at a center position of a thickness of the substrate and outlines at two positions that are spaced apart from the center position in opposite directions along a thickness direction by a predetermined distance, are obtained, and when an inscribed circle and a circumcircle of each of the three outlines are obtained, a difference in radius between a smallest inscribed circle and a largest circumcircle being 5 µm or less, and
    when positions spaced apart from the center position in the opposite directions along the thickness direction by 200 µm exist on the side wall surface, the predetermined distance being 200 µm, and when positions spaced apart from the center position in the opposite directions of the thickness direction by 200 µm do not exist on the side wall surface, the predetermined distance being 100 µm.

2. The annular substrate according to claim 1, wherein
    outlines in the circumferential direction are obtained at two positions on the side wall surface on an outer circumferential side spaced apart by 200 pin in the thickness direction, and a middle point between centers of two least square circles determined from the outlines is referred to as middle point A,
    outlines in the circumferential direction are obtained at positions that are located at centers of the two chamfered surfaces on the outer circumferential side in the thickness direction, and among centers of least square circles determined from the outlines, a center determined from one chamfered surface is referred to as center B, and a center determined from the other chamfered surface is referred to as center C, and
    a sum of a distance between the middle point A and the center B and a distance between the middle point A and the center C is 1 µm or less.

3. The annular substrate according to claim 1, wherein the difference in radius between the inscribed circle and the circumcircle is 3 µm or less.

4. The annular substrate according to claim 1, wherein a thickness of the annular substrate is 0.500 mm or less.

5. A method for manufacturing a magnetic-disk substrate, the method comprising:
    polishing at least the main surfaces of the annular substrate according to claim 1.

6. A method for manufacturing a magnetic disk, the method comprising:
    forming at least a magnetic layer on a main surface of the magnetic-disk substrate obtained from the method according to claim 5.

7. A magnetic-disk substrate comprising:
    a pair of main surfaces;
    a side wall surface formed at an outer circumferential side edge portion; and
    chamfered surfaces interposed between the side wall surface and the main surfaces, respectively,
    a thickness of the magnetic-disk substrate being 0.635 mm or less,
    the side wall surface having a roundness of 1.5 µm or less,
    when, in the side wall surface, three outlines in a circumferential direction of the side wall surface, which include an outline at a center position of a thickness of the substrate and outlines at two positions that are spaced apart from the center position in opposite directions along a thickness direction by a predetermined distance, are obtained, and when an inscribed circle and a circumcircle of each of the three outlines are obtained, a difference in radius between a smallest inscribed circle and a largest circumcircle being 5 µm or less, and
    when positions spaced apart from the center position in the opposite directions along the thickness direction by 200 µm exist on the side wall surface, the predetermined distance being 200 µm, and when positions spaced apart from the center position in the opposite directions of the thickness direction by 200 µm do not exist on the side wall surface, the predetermined distance being 100 pun.

8. The magnetic-disk substrate according to claim 7, wherein
    outlines in the circumferential direction are obtained at two positions on the side wall surface on an outer circumferential side spaced apart by 200 µm in the thickness direction, and a middle point between centers of two least square circles determined from the outlines is referred to as middle point A,
    outlines in the circumferential direction are obtained at positions that are located at centers of the two chamfered surfaces on the outer circumferential side in the thickness direction, and among centers of least square circles determined from the outlines, a center determined from one chamfered surface is referred to as center B, and a center determined from the other chamfered surface is referred to as center C, and
    a sum of a distance between the middle point A and the center B and a distance between the middle point A and the center C is 1 µm or less.

9. The magnetic-disk substrate according to claim 7, wherein
    the difference in radius between the inscribed circle and the circumcircle is 3 µm or less.

10. The magnetic-disk substrate according to claim 7, wherein a thickness of the magnetic-disk substrate is 0.500 mm or less.

11. The magnetic-disk substrate according to claim 7, wherein
    the magnetic-disk substrate is used as a magnetic disk substrate for a shingle write system or a magnetic disk for energy-assisted magnetic recording system.

12. A magnetic disk comprising:
at least magnetic layers on the main surfaces of the magnetic-disk substrate according to claim 7.

13. A magnetic disk in which at least a magnetic layer is formed on a main surface of the magnetic-disk substrate according to claim 8.

14. A magnetic disk in which at least a magnetic layer is fanned on a main surface of the magnetic-disk substrate according to claim 9.

15. A magnetic disk in which at least a magnetic layer is formed on a main surface of the magnetic-disk substrate according to claim 10.

16. A magnetic disk in which at least a magnetic layer is formed on a main surface of the magnetic-disk substrate according to claim 11.

17. A hard disk drive comprising:
the magnetic disk according to claim 12.

18. A hard disk drive comprising:
the magnetic disk according to claim 14.

19. A hard disk drive comprising:
the magnetic disk according to claim IS.

20. A hard disk drive comprising:
the magnetic disk according to claim 16.

* * * * *